(12) United States Patent
Sugerman

(10) Patent No.: US 7,157,505 B2
(45) Date of Patent: Jan. 2, 2007

(54) FAST DRYING COATINGS

(75) Inventor: Gerald Sugerman, Allendale, NJ (US)

(73) Assignee: Vocfree, Inc., Hackensack, NJ (US)

( * ) Notice: Subject to any disclaimer, the term of this patent is extended or adjusted under 35 U.S.C. 154(b) by 0 days.

(21) Appl. No.: 10/653,861

(22) Filed: Sep. 3, 2003

(65) Prior Publication Data

US 2004/0154494 A1     Aug. 12, 2004

Related U.S. Application Data

(60) Provisional application No. 60/408,638, filed on Sep. 5, 2002.

(51) Int. Cl.
*C09D 11/06* (2006.01)
(52) U.S. Cl. ........................ 523/161; 523/160; 523/500
(58) Field of Classification Search ................ 523/500, 523/160, 161
See application file for complete search history.

(56) References Cited

U.S. PATENT DOCUMENTS

| | | | |
|---|---|---|---|
| 5,173,113 A | 12/1992 | Sugerman et al. | |
| 5,178,672 A | 1/1993 | Miller | |
| 5,552,467 A * | 9/1996 | Reiter et al. | 524/270 |
| 5,965,633 A | 10/1999 | Revol | |
| 6,383,982 B1 | 5/2002 | Kida et al. | |
| 6,418,852 B1 | 7/2002 | Franks | |
| 6,441,056 B1 * | 8/2002 | Keller | 522/81 |

FOREIGN PATENT DOCUMENTS

| | | | |
|---|---|---|---|
| GB | 1 514 568 A | | 6/1978 |
| JP | 08092518 A | * | 4/1996 |
| WO | WO 99/32563 | | 7/1999 |

OTHER PUBLICATIONS

International Search Report for PCT/US03/27568; mailed on Mar. 1, 2004.

* cited by examiner

*Primary Examiner*—David W. Wu
*Assistant Examiner*—Satya B. Sastri
(74) *Attorney, Agent, or Firm*—Edwards Angell Palmor & Dodge LLP; Jeffrey D. Hsi

(57) ABSTRACT

Novel, rapidly drying, low volatile organic compound (VOC), minimal dot gain coatings, (including lithographic ink and varnish systems) are herein described. These systems dry sufficiently rapidly, that their usage eliminates ink drying speed as the rate limiting factor in most lithographic printing applications. In addition to providing enhanced drying rates as compared with their conventional counterparts, the rapid drying, low/no VOC lithographic coating systems of the instant invention can provide the user with significant improvement in dried film rub resistance.

29 Claims, No Drawings

FAST DRYING COATINGS

CROSS-REFERENCE TO RELATED APPLICATIONS

This application claims benefit of U.S. application Ser. No. 60/408,638, filed Sep. 5, 2002, which is incorporated by reference in its entirety.

BACKGROUND

Conventionally, lithographic (litho) inks, and varnishes have been designed to dry via combination of solvent evaporation and oxidative polymerization of unsaturated components.

Consequent to increasing concerns regarding the health, safety, and environmental impacts of volatile organic compounds, (VOCs); the contribution of this component (the evaporation of solvent is presently responsible for the major proportion of conventional litho inks' and varnish's drying speeds) to drying rates is anticipated to shrink in the future, as increasingly stringent limitations are placed on the usage of VOCs. Stacking of fresh prints in order to conserve space, which is typical during long runs, frequently limits the efficacy of solvent evaporation as a drying mechanism. Additionally the incorporation of solvents in litho inks results in undesirable distortion (e.g., capillary spread prior to drying) of applied ink droplets (dot gain), thus limiting print resolution. The extent of dot gain beyond that consequent to the small proportion resulting from the mechanics of imperfect application of ink to a moving substrate tends to be roughly proportional to the percentage of VOCs employed, hence solvent incorporation into litho ink formulations often limits print quality.

The oxidative-polymerization component of the drying of present litho inks almost invariably requires acceleration by toxic heavy metals such as cobalt and manganese, and is often kinetically limited by oxygen availability, especially when printing on essentially non-porous surfaces, and/or when fresh prints are stacked tightly, minimizing air access. A number of technologies have been developed to overcome drying rate limitations of conventional litho inks; these acceleration techniques include, the inclusion of various energy input systems, such as thermal energy (headset, and infrared drying), electron beam (EB), and ultraviolet (UV) radiation. The latter methodology typically requires incorporation of substantial proportions of a combination of expensive, and often-toxic photo initiators, and related auxiliaries, in addition to the expensive hardware, intensive energy consumption, and radiation exposure hazards, implicit in the generation of short wave length radiation used in both EB and UV based curing systems.

U.S. Pat. No. 5,552,467 teaches the usage of thermally activated combinations of chemical reducing agents, and organic (hydro)peroxides, one placed in the ink and the other contained in fountain solution as a means of overcoming the oxidative-polymerization drying component rate limitations of heat set lithographic inks. The patent discloses the use of two-part systems that inherently exclude usage in single fluid inks, and is limited further limited by the reactivity of the components, resulting in relatively short shelf life of solutions and/or dispersions of many organic (hydro)peroxides, and of reducing agents in unsaturated oil based vehicles, especially those containing carbon black an/or heavy metal based pigments, and in gum containing fountain solution concentrates. The specified technology has not been claimed to be effective for use in systems which must dry at/or near ambient temperatures.

U.S. Pat. No. 5,173,113 teaches the utility of hydrogen peroxide as a fountain solution additive for the acceleration of drying of lithographic inks, by a factor of approximately twofold. This combination, however, is used as a two-part system, thus inherently precluding use in single fluid inks.

It has now been surprisingly found that the incorporation of moderate percentages of a combination of solutions of poly(hydroxy) aliphatic acid(s) in unsaturated fatty acids, and organic zirconium compounds, optionally in combination with multifunctional (meth)acrylate esters into otherwise conventional lithographic inks, and related vehicles and varnishes, both significantly enhances the drying rates of these inks and improves their flow. These materials have also been found to effectively utilize of low levels (10 to 5,000 parts per million (ppm) of organic (hydro)peroxides and/or of inorganic salts of peroxy acids, (cofactor reducing agents are thus not required) as replacements for the thermally activated organic (hydro)peroxide-reducing agent combination(s) and/or hydrogen peroxide as fountain solution additive drying accelerators, such as those described in U.S. Pat. Nos. 5,552,467, and 5,173,113, respectively.

SUMMARY

The invention relates to compositions, methods of making the compositions, and methods of using the compositions for coating applications. The coatings are suitable as inks, varnishes, paints, and the like. In one aspect the coatings are fast drying, relative to existing technologies, and offer other advantages (e.g., print quality, color fastness, reduced or no VOC components, reduced or no toxic metal-containing components) useful in print and coatings applications.

The compositions of the invention incorporate moderate percentages of a combination of 2 to 15 weight percent of (10 to 35 wt. %) solutions of poly(hydroxy) aliphatic acid(s) in unsaturated fatty acids, and 0.4 to 4 weight % of organic zirconium compound(s), preferably in combination 1 to 7 weight % of multifunctional (meth)acrylate ester(s) into otherwise conventional lithographic inks, and related vehicles and varnishes.

In one aspect, the invention relates to a composition having unsaturated fatty acid solutions of one or more poly alpha (hydroxy)aliphatic acids, and less than 10 weight % of one or more multifunctional (meth)acrylate esters, vinyl ethers, or combinations thereof. The compositions can further include 0.4 to 4 weight % of one or more organic zirconium(4) compounds; one or more inorganic salts of peracids; 0.4 to 4 weight % of one or more organic zirconium(4) compounds and one or more inorganic salts of peracids; can include 2 to 15 weight percent of drying oil derived fatty acid solutions of 10–35 wt % of one or more poly alpha (hydroxy)aliphatic acid(s), 0.4 to 4 weight % of one or more organic zirconium(4) compounds, 1 to 7 weight % of one or more multifunctional (meth)acrylate esters, vinyl ethers, or combinations thereof, and catalytic proportions of one or more inorganic salts of peracids; or can include catalytic proportions of organic (hydro)peroxides; one or more additional ink vehicle or varnish components (e.g., solids, alkyds, polyesters or polyamides); or can have one or more compounds delineated in any of the tables herein (e.g., Tables A–D or 1–4).

Another aspect is a method of printing including using an ink having any of the compositions delineated herein, including those having unsaturated fatty acid solutions of one or more poly alpha (hydroxy)aliphatic acids, and less than 10 weight % of one or more multifunctional (meth) acrylate esters, vinyl ethers, or combinations thereof. The method can include applying the ink to a printing press; can be wherein the printing is lithographic printing; can be that wherein the printing includes printing on paper; or can involve any composition delineated herein having one or more compounds delineated in any of the tables herein (e.g., Tables A–D or 1–4).

In another aspect, the invention relates to a method of printing including using an ink vehicle or varnish having any of the compositions delineated herein, including those having unsaturated fatty acid solutions of one or more poly alpha (hydroxy)aliphatic acids, and less than 10 weight % of one or more multifunctional (meth)acrylate esters, vinyl ethers, or combinations thereof. The method can be that wherein the ink vehicle or varnish is mixed with a fountain solution.

Another aspect is a fountain solution having any of the compositions delineated herein, including those having unsaturated fatty acid solutions of one or more poly alpha (hydroxy)aliphatic acids, and less than 10 weight % of one or more multifunctional (meth)acrylate esters, vinyl ethers, or combinations thereof, and one or more organic zirconium (4) compounds; and wherein the organic zirconium(4) compounds are 0.4 to 4 weight % of the total solution.

Another aspect is a method of printing including mixing any fountain solution delineated herein with an ink vehicle or varnish. The method includes that wherein the ink vehicle or varnish comprises 2 to 15 weight percent of one or more drying oil derived fatty acid solutions of 10–35 wt % of poly alpha (hydroxy)aliphatic acid(s); that wherein the ink vehicle or varnish further comprises 1 to 7 weight % of one or more multifunctional (meth)acrylates; that wherein the fountain solution further comprises one or more organic (hydro)peroxides or one or more inorganic salts of a peracid; or that wherein the ink vehicle or varnish comprises solids, alkyds, polyesters or polyamides. The method can further include contacting the composition or ink vehicle delineated herein with water (e.g., air, water source, other moisture source) immediately prior to use in printing or immediately prior to application to a printing press.

In another aspect, the invention is a composition made by the process of combining 2 to 15 weight percent of one or more drying oil derived fatty acid solutions of 10–35 wt % of one or more poly alpha (hydroxy)aliphatic acid(s), 0.4 to 4 weight % of one or more organic zirconium(4) compounds, 1 to 7 weight % of one or more multifunctional (meth)acrylate esters, vinyl ethers, or combinations thereof, and catalytic proportions of one or more inorganic salts of peracids. The process can further include combining water (e.g., air, water source, other moisture source).

Preferred embodiments of the instant invention include those lithographic ink formulations which incorporate from about 4 to about 10 weight percent of (10 to 35 wt %) solutions of short chain (2 to 6 carbon atom monomer) poly (hydroxy)aliphatic carboxylic acids solutions in drying oil derived fatty acids, in addition to 2 to 7 weight percent of essentially non-volatile multifunctional (meth)acrylates, and/or vinyl ethers.

Most preferred is the employment of the herein described combinations of conventional high, (preferably 100%) solids, alkyd, polyester and/or polyamide based ink vehicles, in combination with 4 to 10 weight percent of drying oil derived fatty acid solutions containing 10–35 wt % of poly(hydroxy)aliphatic acid(s), and 0.4 to 4 weight % of organic zirconium(4) compounds, preferably in combination with 1 to 7 weight % of multifunctional (meth)acrylate esters, and catalytic proportions of organic (hydro)peroxides and/or of inorganic salts of peracids (which peroxide components may be present in either the ink or fountain solution (if the last is employed), to minimize/eliminate the need to include toxic heavy metals, and or volatile solvents in the system.

In one aspect, the compositions are any of those delineated herein wherein they comprise reduced levels (relative to conventional amounts, e.g., <1 weight % metal, about 0.05 to 0.7 weight % metal), or are devoid of, toxic heavy metals (e.g., cobalt, manganese), including in elemental or salt forms.

The introduction of said of poly (hydroxy)aliphatic acid(s), organic zirconium compound combinations as (optionally partial) solvent replacements, in otherwise conventionally formulated litho inks and varnishes not only reduces VOC emissions, minimizes/eliminates the need for the inclusion of toxic heavy metals such as cobalt, and substantially enhances the drying acceleration effects of (organic (hydro)peroxide-reducing agent combinations (cofactor reducing agent requirements are eliminated), and/or fountain solution hydrogen peroxide addition, as taught by the prior art, but additionally provides significant performance improvements relative to the prior art. These improvements include the minimization of dot gain, and virtual elimination of ghosting (penetration of porous substrates by ink via capillary wetting), increased gloss potential, and enhanced pigment dispersion rates. The upgrades enabled via the application of the teachings of this invention permits the formulator to design reduced and/or solvent free litho inks, superior to their conventional, (alkyd-polyester-polyamide resin) based solvent borne, known art analogs.

In essence, this invention teaches the use of litho ink systems, which employ minor proportions of 2 to 15 weight percent of (10 to 35 wt. %) solutions of poly(hydroxy) aliphatic acid(s) in unsaturated fatty acids, and 0.4 to 4 weight % of organic zirconium(4) compounds and preferably in combination 1 to 7 weight % of multifunctional (meth)acrylate esters as optionally partial) solvent replacements in otherwise conventional lithographic inks. Said replacement, reduces VOC's, significantly enhances the drying rates of these inks and controls viscosity, and enhances the utility of low levels (10 to 5,000 ppm) of organic (hydro)peroxides and or inorganic salts of peroxy acids as cure accelerators. These accelerators may, usefully, be incorporated into the ink and/or into the fountain solution (when employed in wet plate lithography), at levels of the order of about 10 to about 5,000 parts per million (ppm). When said accelerators are activated via readily applicable techniques, e.g. chemically, thermally, and or exposure to radiation, these materials decompose to active species which affect rapid polymerization based cure of the ink The details of one or more embodiments of the invention are set forth in the accompanying drawings and the description below. Other features, objects, and advantages of the invention will be apparent from the description and drawings, and from the claims.

DETAILED DESCRIPTION

The compositions and methods of the invention relate to coatings, and in one aspect inks. Materials that are standard and conventional in the art are suitable for use in the compositions and methods herein.

Lithographic printing is the art or process of printing from a flat plate in which the desired image is achieved by construction of said plate such that selective adhesion of the printing ink to plate occurs in the desired image area(s), followed by contact transfer of said image either directly, or indirectly to a substrate (e.g., paper, plastic, metal).

Unsaturated fatty acids are defined as materials having the composite structure $HOC(O)(CR^1R^2)_n(R^3C=CR^4)m\ R_7$, wherein m is an integer from one to about 5, wherein n is an integer from 3 to about 20, and wherein each of the various R groups (e.g., $R^1, R^2, R^3, R^4$) is independently chosen from among hydrogen or is a monovalent hydrocarbyl group having from one to about four carbon atoms. The various $(CR^1R^2)$ and $(R^3C=CR^4)$ need not be consecutive or in conjugation, but may be connected to each other in any order. Unsaturated fatty acids useful in the compositions and methods herein include, for example, those listed in the tables herein.

Organozirconium compounds are compounds (or complexes) having organic (i.e., carbon and hydrogen containing) functional groups bound (including covalently or through noncovalent binding interactions) to zirconium atom(s). In one aspect the compounds are those having a zirconium atom in an oxidation state of (IV). Organozirconium compounds useful in the compositions and methods herein include, for example, those listed in the tables herein.

(Meth)acrylate esters are herein defined as materials having the general structure $[RCH_2=CHC(O)O]nR'$, wherein n is an integer larger than 1; each R is independently chosen from hydrogen, or a $CH_3$ group, and R' is chosen from among hydrocarbyl groups having from two to about 20 carbon atoms each, except that the number of carbon atoms in each R' must equal or exceed n. (Meth)acrylate esters useful in the compositions and methods herein include, for example, those listed in the tables herein. The compositions may have one or more (e.g., 2, 3, 4, 5 methacrylate esters) in them.

Multifunctional vinyl ethers are herein defined as organic chemicals which contain the structure $[RRC=CRO]nR'$ wherein n is a n integer larger than 1; each R is independently chosen from hydrogen, or a $CH_3$ group, and R' is chosen from among hydrocarbyl groups having from two to about 10 carbon atoms each.

Inorganic salts of peracids (or peroxy acids) are herein defined as salts of acids containing the structure (O—O$^-$), in which the cation has a positive electrical charge on an atom other than hydrogen, or carbon. Inorganic salts of peracids useful in the compositions and methods herein include, for example, those listed in the tables herein. In some aspects of the invention, the inorganic salts of peracids are used in catalytic amounts (e.g., less than about 0.5 weight percent, less than about 0.25 weight percent, less than about 0.1 weight percent, based on total weight of the composition; or between about 1 and 100,000 ppm, between about 1 and 50,000 ppm).

Organic hydroperoxides are defined as an organic compound containing the structure C—O—O(R) wherein R is a chosen from among hydrogen, or a group bonded through carbon to the peroxide oxygen. Organic hydroperoxides useful in the compositions and methods herein include, for example, those listed in the tables herein.

The variety of unsaturated fatty acids, poly (hydroxy) aliphatic carboxylic acids, organo zirconium compounds, (meth)acrylate esters, vinyl ethers, and accelerators, useful in the practice of this invention is very large, however for the sake of brevity, only 10 examples of preferred members of each class of materials are provided in Tables A through E respectively. The examples provided hereinafter are intended to be illustrative of, and not to exhaustive of nor to limit the scope of this invention. Those skilled in the art will easily be able to provide many more examples of each class of such components with minimal difficulty, and without departing from the teachings of this invention.

An ink vehicle is a combination of components, other than pigments, which is collectively suitable for ink compositions. In one aspect, the ink vehicle contains certain components that are incompatible for storage with other ink components (i.e., when in contact, an irreversible reaction takes place, which may be undesirable or may be desired to be controlled such that the reaction takes place immediately prior to, or concurrent with, use of the resulting product (e.g., ink) for printing). In such instance, one of the incompatible components is placed in the ink vehicle and the other is placed in a second ink vehicle (e.g., fountain solution) for mixing immediately prior to, or concurrent with, use. The ink vehicle can include any of the materials delineated herein, or can also include any standard ink vehicle component know in the art, including for example, solids, alkyds, polyesters or polyamides suitable for ink or printing compositions, and the like. The same material can be considered a varnish when pigments are absent from the composition. Varnishes are expressly considered one aspect of the compositions delineated herein.

The compositions herein are useful in lithographic printing applications. Such applications can be intaglio or off-set, including sheet-fed, cold-web, and heat set web printing.

The invention will be further described in the following example. It should be understood that these examples are for illustrative purposes only and are not to be construed as limiting this invention in any manner.

EXAMPLES

TABLE A

[Poly (hydroxy) aliphatic carboxylic acids/ derivative esters]

| Material Designation | [Poly (hydroxy) aliphatic carboxylic acids] constituent monomer(s) |
|---|---|
| AA | hydroxy acetic acid |
| AB | 2-hydroxy propionic acid |
| AC | 2-hydroxy-2-methyl 3-butenoic acid, |
| AD | 2 hydroxy butyric acid |
| AE | 2-hydroxy-6-caprolactone |
| AF | ethyl 2 hydroxy propanoate |
| AG | methyl 2-hydroxy (2-methyl)-3-butenoate |
| AH | hydroxy acetic acid, 3-hydroxy i-pentanoic acid |
| AI | 2-hydroxy-3-methoxy-isobutyric acid |
| AJ | 2 hydroxy-4-butyrolactone, 2-hydroxy propionic acid, 2-hydroxy 4-pentenoic acid |

TABLE B

[Organo zirconium (4) compounds]

| Material Designation | Organo zirconium (4) compounds |
|---|---|
| BA | zirconium(4) tetrakis octanolato, adduct 2 moles of (bis tridecyl) phosphite |
| BB | zirconium(4) tetrakis i-decanolato, adduct 2 moles of (tris lauryl) phosphite |
| BC | oxo zirconium(4) bis i-pentadecanoate |
| BD | zirconium(4) 2-propanolato, tris (bis butyl)phosphato-O |
| BE | zirconium(4) neodecanolato, tris (phenyl) sulfonato-O |
| BF | zirconium(4) t-butanolato, tris (ethyl, benzyl) phosphito |

TABLE B-continued

[Organo zirconium (4) compounds]

| Material Designation | Organo zirconium (4) compounds |
|---|---|
| BG | zirconium(4) bis iso-hexanolato, cyclo (bis allyl) diphosphato-O,O |
| BH | ethylenediolato zirconium(4) cyclo (bis allyl) diphosphato-O,O |
| BI | 1,3-propylendiolato zirconium(4) linolenate, myristate |
| BJ | Bis 1,4-butene-2 diolato zirconium(4) adduct 1 mole of tris (bis oleyl) phosphite |

TABLE C

[Multifunctional (meth)acrylates]

| Material Designation | Multifunctional (meth)acrylates |
|---|---|
| CA | Tris methylol propane tris acrylate |
| CB | pentaerythritol trimethacrylate |
| CC | sorbitol tetrakis acrylate |
| CD | tetrakis 1,2-propylene glycol acrylate, methacrylate |
| CE | terphthalic acid bis 2-methacrylatoethyl ester |
| CF | ethoxylated(3) bisphenol A dimetacrylate |
| CG | acrylate terminated polybutadiene(12) |
| CH | Bis trimethylol propane bis acrylate, bis allyl ether |
| CI | zinc bis methacrylate |
| CJ | 60% castor oil tris acrylate, 40% 1,4-cyclhexane bis methacrylate |

TABLE D (Accelerators)

| Material Designation | Peroxy acid salt | Incorporated into Ink (I) or Fountain Solution (F) | Preferred activation method |
|---|---|---|---|
| DA | sodium peroxy diphosphate | I or F | water. |
| DB | sodium perborate | I or F | water |
| DC | sodium persulfate | I or F | water, thermal |
| DD | sodium peroxy disulfate | I or F | thermal, |
| DE | calcium perphthalate | I | thermal, or rad. |
| DF | aluminum percarbonate | I | water, thermal. |
| DG | potassium perhenate | I | thermal, radiation |
| DH | t-butyl hydroperoxide | F | none required |
| DI | magnesium per t-butoxide | I | water, thermal |
| DJ | sodium peracetate | I or F | water, thermal |

Example 1

Method for the preparation of the poly (hydroxy) aliphatic acid-fatty acid solutions A nitrogen blanketed pyrex glass lined vessel, equipped with an external heating-cooling jacket, a high speed disperser, and appropriate inlet and outlet ports, was charged with 150 kg of rapeseed oil fatty acid, and 75 g of 1,2,3-tris methoxy benzene. The charge was heated to and maintained, under nitrogen, at 140° C. for 3.5 hr. during which period 50 kg of poly (6) caprolactone (Mw 2700, Mn 1290) (Dow Chemical Corp. Tone polymer) was incrementally added and dissolved. Under high shear. The resulting tan solution was cooled to ambient and discharged. Yield of a low viscosity of a freely flowing liquid solution (25 wt %) poly 6-hydroxy caproic acid. Product designation 1A.

Similarly prepared in near quantitative yields were a 32% solution of poly lactic acid (Dow material) in oticca oil fatty acid (1B), and an 11% solution of poly glycolic acid (Dupont) in tung oil fatty acid (1C).

Example 2

Method for the Preparation of the Poly (Hydroxy) Aliphatic Acid-Fatty Acid Solutions A nitrogen blanketed pyrex glass lined vessel, equipped with an external heating-cooling jacket, a high speed disperser, distillation column, distillate receiver, and appropriate inlet and outlet ports, was charged with 150 kg of soya been oil fatty acid, 325 g of antimony pentoxide and 75 g of 1,2,3-tris methoxy benzene. The charge was heated to and maintained, under nitrogen, at 160° C. for 3.5 hr. during which period 30 kg of 4-butyrolactone, and 15 kg each of 2-hydroxy propionic acid, and 4-hydroxy 2-pentenoic acid were premixed and continuously added. After completion of the materials addition (water was observe red to distill continuously), the reaction temperature was raised to 200° C. and maintained at said temperature for @25 mm Hg vacuum for two hours. The product was recovered as a light brown modest viscosity solution after cooling to 70° C. C prior to discharge. Under high shear. The resulting tan solution was cooled to ambient and discharged. Product yield was 97.7 weight %, as a low viscosity, freely flowing liquid solution (nominally 28.6 wt % terpolymer in soya oil fatty acid). Yield of distillate water [>99% Gas Chromatographic (GC) assay] was 2.16%, 98.9% of theory. Product designation 2A Similarly prepared under comparable conditions, using the indicated reagents were a variety of analogs poly (hydroxy)carboxylic polymer solutions in unsaturated fatty acids. Cf. Table 2.

TABLE 2

| Product Designation | Raw Material inputs/kg. | Distillate yield kg/% of theory | Polymer Solution yield, wt/% of theory |
|---|---|---|---|
| 2B | safflower oil fatty acid/130; AD/70; stannous octoate 0.10 | <0.03 water/ *1 | 99.9 |
| 2C | walnut oil fatty acid/140; AF/ 98.3; tetra isooctyl titanate/0.20 | 38.1/ *2 | 100.1 |
| 2D | tung oil fatty acid/150; AI/ 57.75; | 7.72/99.5 *3 | 100.0 |
| 2F | oticicca oil fatty acid/175; AE/ 15; 88% Abaq./ 28.4; methane sulfonic acid 0.25 | 8.37/99.4 *3 | 99.7 |
| 2G | linseed oil fatty acid/85; hemp oil fatty acid*4/85, AD/30, | <0.04 water/ *1 | 99.8 |

TABLE 2-continued

| Product Designation | Raw Material inputs/kg. | Distillate yield kg/% of theory | Polymer Solution yield, wt/% of theory |
|---|---|---|---|
| | stannous chloride 0.40 | | |

* Notes:
1) Yield of water (GC assay >99%)- present in initial raw materials
2) Ethanol (GC 98.2%), water 0.35%- present in initial raw materials.
3) (GC assay >99% water).
4) Alkaloids depleted by 75% aq. Methyl alcohol extraction, prior to hydrolysis.

Example 3

Methods for the preparation of the rapidly drying lithographic ink vehicles demonstrating benefits of same versus conventional technology; i.e. enhanced gloss, rub resistance, and set and drying rates A 200 gallon water jacketed 316 ss mixing tank equipped with a 10 horsepower slow speed agitator was heated to, mixed and maintained at 50–65° C. during the sequential addition of 1A, 80 lb.; Ultrex 100, 240 lb., Ultrex 110 562 lb. [Ultrex (aluminum gelled soya alkyd) resins were supplied by Lawter Div. Of Eastman Chemical Co.); BA 18 lb, and aluminum stearate 4.5 lb. The resulting solution (3A) was evaluated for utility as a an overprint varnish. A portion of this varnish was converted to a lithograph ink by dispersion therein of 16 weight percent of a phthalocyanine blue pigment (Ciba Irgalite blue LGE). Both the ink and the varnish were evaluated versus control formulations in which the 1A, and BA were replaced by like proportions of 300° F. Magie 300 ink oil (Mobil Oil), and 6% cobalt naphthenate respectively, producing inks and varnishes each having 400 rpm tack readings of 6.8, for both the test and control inks, and 5.5 and 5.7, for the control and test varnishes, respectively.

Five thousand sheets of each set of inks and overprint varnishes were each printed (full coverage), both independently and sequentially, on a Komori two color sheetfed press, @ 9,500 prints/hr. using 60 lb. Coated paper stock (international Paper Co.), and stacked in single piles maintained @ 23–23° C. Evaluation of the resulting prints showed that the ink derived from the practice of the instant invention dried 32% faster, and was 7% glossier than its conventional counterpart. (through dry time 5 hr, 42 min. vs. 8 hr. 23. min.; gloss 93.5% vs 87.0%) The overprint varnish of the instant invention, dried 46% faster (7 hr. 19 min. vs. 13 hr 34 min.), and dried to a gloss 3% higher than its solvent based alternative (95.2 vs. 92.3%. The drying of the combination of ink and overprint varnish printed prints required 8 hr. 34 min. vs. 14 hr. 52 min for the control system, a 59% time savings.

Furthermore the prints prepared from either the ink or varnish produced via the teachings of the instant invention could be stacked at depths of 5,000+ sheets, without offsetting, but the conventional ink and varnish (independently or as a composite) need offset powder at stacking levels above 2,730 sheets, even after application of high doses of offset powder; whereas ink products of the instant invention, individually, required the use of only amounts of offset powder. However the composite prints produced by applying both the ink and varnish of the instant invention required modest offset powder application in order to eliminate offset at stack depths above 4,200 sheets. Gloss improvement for overprint varnished blue ink was 3.5% vs. the control system (94.4 vs. 91.7).

Further improvement vs. the control formulation was achieved by heating product 3A for a period @ a temperature of from about 100 to about 170 ° C. under nitrogen, and cooling to ambient prior to evacuation. 3AH (Through drying times for the derived ink, varnish and ink-varnish combination were reduced to 5 hr. 16 min.; 6 hr. 11 min. and 6 hr. 42 min. respectively upon heating the varnish/ink vehicle @ 130+/–10° C. for two hours prior to use. Similar treatment of the control formulations, produced no measurable improvements. Similarly produced and evaluated were a series of analogous products using a variety of ink, pigment, varnish, and vehicle components and vehicle heat treatment conditions. The resulting formulations are compiled in Table 3A. these Inks, and varnishes, were printed on a four color Man Roland 700 press, using Unigraphics 500 fountain solution Optionally modified as indicated, diluted to a conductivity of 1800–2500 siemans with deionized water. The results of these investigations are provided in Table 3B.

TABLE 3A

| Material Identification | Formulation/wt. % | Varnish Heat history/hr./° C. |
|---|---|---|
| 3BV | tung-linseed varnish[1]/28.8; gelled soy varnish[2]/52.8; 2C/7.2; BC4.2; PE wax[5]/0.6 PTFE[6]/2.4 | 60–70/1.5 |
| 3BH V | tung-linseed varnish[1]/28.8; gelled soy varnish[2]/52.8; 2C/7.2; BC4.2; PE wax[5]/0.6 PTFE[6]/2.4 | 60–70/1.5 + 150–160/2 |
| 3B Ink | tung-linseed varnish[1]/24; gelled soy varnish[2]/44; carbon black[3]/18; Alkali Blue[4]/2; 2C/6; BC3.5; PE wax[5]/0.5 PTFE[6]/2 | 60–70/1.5 |
| 3BH Ink | tung-linseed varnish[1]/24; gelled soy varnish[2]/44; carbon black[3]/18; Alkali Blue[4]/2; 2C/6; BC/3.5; PE wax[5]/0.5; PTFE[6]/2 | 60–70/1.5 + 150–160/2 |
| 3BH1 | tung-linseed varnish[1]/24; gelled soy varnish[2]/40; carbon black[3]/18; Alkali Blue[4]/2; 2C/6; BC/3.5; PE wax[5]/0.5; PTFE[6]/2; CC[7]/4. | 60–70/1.5 + 150–160/2 |
| 3B Control Varnish | tung-linseed varnish[1]/28.8; gelled soy varnish[2]/52.8; Magie 300 oil[8]/9.0; 12% Mn octoate[9]/2.4; PE wax/0.6; PTFE[6]/2.4. | 60–70/1.5 |
| 3B Control Ink | tung-linseed varnish[1]/24; gelled soy varnish[2]/44; carbon black[3]/18; Alkali Blue[4]/2; Magie 300 oil[8]/7.5; 12% Mn octoate[9]/2; PE wax/0.5; PTFE[6]/2. | 60–70/1.5 |

TABLE 3A-continued

| Material Identification | Formulation/wt. % | Varnish Heat history/hr./° C. |
|---|---|---|
| 3BH Control Ink | tung-linseed varnish[1]/30; gelled soy varnish[2]/44; carbon black[3]/18; Alkali Blue[4]/2; Magie 300 oil[8]/7.5; 12% Mn octoate[9]/PTFE[6]/2 | 60–70/1.5 |
| 3C Varnish | Polyamide varnish [10]/46; polyester-oil varnish[11]/40 2G/11; BH/3 | 40–45/2.5 |
| 3C Ink | Polyamide varnish [10]/40; polyester-oil varnish[11]/32 yellow pigment[12]/14; 2G/11; BH/3 | 40–45/2.5 |
| 3C1 Ink | Polyamide varnish [10]/40; polyester-oil varnish[11]/30 yellow pigment[12]/14; 2G/11; BH/3; CE[7]/2 | 40–45/2.5 |
| 3C2 Ink | Polyamide varnish [10]/40; polyester-oil varnish[11]/30 yellow pigment[12]/14; 2G/11; BH/3; CH[7]/2 | 40–45/2.5 |
| 3CH | Polyamide varnish [10]/40; polyester-oil varnish[11]/32 yellow pigment[12]/14; 2G/11; BH/3. | 40–45/2.5 + 110–120/6 |
| 3CH1 | Polyamide varnish [10]/40; polyester-oil varnish[11]/30 yellow pigment[12]/14; 2G/11; BH/3; CE[7]/2. | 40–45/2.5 + 110–120/6 |
| 3CH2 | Polyamide varnish [10]/40; polyester-oil varnish[11]/30 yellow pigment[12]/14; 2G/11; BH/3; CH[7]/2. | 40–45/2.5 + 110–120/6 |
| 3C Control Varnish | Polyamide varnish [10]/46; polyester-oil varnish[11]/40 tetradecanol/7.5; 12% zirconium octoate[9]/3. | 40–45/2.5 |
| 3CH Control Varnish | Polyamide varnish [10]/46; polyester-oil varnish[11]/40 tetradecanol/7.5; 12% zirconium octoate[9]/3. | 40–45/2.5 110–120/6 |
| 3C Control Ink | Polyamide varnish [10]/40; polyester-oil varnish[11]/32 yellow pigment[12]/14; tetradecanol/7.5; 12% zirconium octoate[9]/3. | 40–45/2.5 |
| 3CH Control Ink | Polyamide varnish [10]/40; polyester-oil varnish[11]/32 yellow pigment[12]/14; tetradecanol/7.5; 12% zirconium octoate[9]/3. | 40–45/2.5 + 110–120/6 |

Notes:
[1]Lawter-3020;
[2]Lawter-Gellusoy:
[3]Cabot 400R;
[4]BASF,
[5]Honeywell AC 540A;
[6]Shamrock SST-4;
[7]All acrylates, and methacrylates employed, were obtained from Sartomer Corp.
[8]Pennzoil Corp.
[9]OMG corp.
[10]Lawter-Nypol 7;
[11]Lawter Terlon 1;
[12]Ciba Yellow 12;
[13]Blend of Lawter-Geltung 3/60% Geltung 7/40%;
[14]Lenape Corp 5500.

TABLE 3B

| Material Designation | Set rate limited Press Speed K Impressions/hr | Ink through dry to touch time hr. | Film Gloss % @ 60° | Rubs to Film Failure[1] |
|---|---|---|---|---|
| 3BV | 12.2 | 17.6 | 94.7 | >800 |
| 3BHV | 12.2 | 14.1 | 94.2 | >800 |
| 3B | 12.8 | 16.4 | 95.1 | >800 |
| 3BH | 12.5 | 11.3 | 96.2 | >800 |
| 3BH1 | 13.0 | 9.9 | 95.7 | >800 |
| 3B control Var. | 9.7 | 28.4 | 90.8 | 490 |
| 3B control Ink | 9.9 | 22.1 | 89.6 | 470 |
| 3BH control Ink | 9.8 | 21.7 | 89.9 | 505 |
| 3C Var. | 11.9 | 15.8 | 94.7 | >800 |
| 3C Ink | 12.3 | 12.2 | 94.9 | >800 |
| 3C1 Ink | 12.5 | 10.2 | 96.1 | >800 |
| 3C2 Ink | 12.7 | 10.7 | 95.7 | >800 |
| 3CH Ink | 13.1 | 9.7 | 96.0 | >800 |
| 3CH1 Ink | 13.1 | 9.4 | 94.4 | >800 |
| 3CH2 ink | 13.3 | 9.8 | 95.1 | >800 |
| 3C control Var. | 9.4 | 22.1 | 91.7 | 540 |
| 3CH Control Var. | 9.8 | 21.8 | 90.0 | 565 |
| 3C Control Ink | 10.2 | 19.6 | 90.9 | 485 |
| 3CH Control Ink | 10.1 | 19.9 | 92.1 | 460 |

Notes:
[1]Sutherland Abrasion Test after 72 hr. cure at ambient temperature.

Similarly produced and evaluated were a series of analogous products using a variety of ink, pigment, varnish, and vehicle components and vehicle heat treatment conditions. The resulting formulations are compiled in Table 3A. These inks, and varnishes, were printed on a four color Man Roland 700 press, using Unigraph 500 fountain solution. Optionally modified as indicated, diluted to a conductivity of 1800–2500 siemans with deionized water. The results of these investigations are provided in Table 3B.

Example 4

Utility of inorganic salts of peroxy acids, and of organic (hydro) peroxides as accelerators for the cure of the inks of the instant invention, in increasing the set limited press speed, and drying speed of the inks instant invention as compared to the response of their art counterparts Selected inks formulated as defined in Table 3A were printed using the same press, and conditions as were employed in Example 3, except that the ink or fountain solution employed therein were modified by the addition of the indicated ppm of an accelerator as specified. The results of this evaluation are presented in Table 4.

TABLE 4

| Material Designation | Accelerator/ ppm In I/F | Set rate limited Press Speed K Impressions/hr | 24 Hr Rubs to film failure | 72 Hr. Rubs to film failure |
|---|---|---|---|---|
| 3BV | none | 12.2 | 570 | >800 |
| 3BV | DA/5000/F | >14* | >800 | >800 |
| 3BV | DI/250/F | >14* | >800 | >800 |
| 3BHV | none | 12.2 | 685 | >800 |
| 3BHV | DD/100/I | >14* | 780 | >800 |
| 3BHV | DJ/50/F | >14* | 750 | >800 |
| 3B | none | 12.8 | 565 | >800 |
| 3B | DF/30/I | 13.9 | 710 | >800 |
| 3B | DF/100/I | >14* | >800 | >800 |
| 3BH | none | 12.5 | 605 | >800 |
| 3BH | DH/40/F | 13.6 | 670 | >800 |
| 3BH | DH/100/F | >14* | 720 | >800 |
| 3BH | DH/1000/F | >14* | 750 | >800 |
| 3B control Var. | none | 9.7 | <100 | 490 |
| " | DH/1000/F | 10.2 | 195 | 515 |
| " | DI/100/F | 10.4 | 190 | 525 |
| 3B control Ink | none | 9.9 | 110 | 470 |
| " | DF/1000/I | 10.3 | 165 | 505 |
| " | DH/1000/F | 10.1 | 205 | 490 |
| 3BH control Ink | | 9.8 | <100 | 505 |
| " | | 10.0 | 155 | 590 |
| 3C Var. | | 11.9 | 390 | >800 |
| 3C Var. | DA/100/I | 12.9 | 610 | >800 |
| 3C Var. | DA/100/F | 13.1 | 635 | >800 |
| 3C Var. | DB/200/F | 13.0 | 430 | >800 |
| 3C control Var. | none | 9.4 | 145 | 565 |
| " | DG/500/I | 10.4 | 230 | 605 |
| " | DG/500/F | 10.3 | 250 | 590 |
| 3C Control Ink | none | 10.2 | 165 | 485 |
| " | DC/1000/F | 10.4 | 310 | 540 |
| " | DC/1000/I | 10.5 | 300 | 525 |
| " | DH/100/F | 10.7 | 290 | 505 |
| " | DH/5000/F | 10.9 | 305 | 515 |
| " | DJ/1000/F | 11.1 | 290 | 540 |
| " | DJ/1000/I | 11.0 | 265 | 540 |

The compounds of this invention (including as used in compositions herein) may contain one or more asymmetric centers and thus occur as racemates and racemic mixtures, single enantiomers, individual diastereomers and diastereomeric mixtures. E-, Z- and cis-trans-double bond isomers are envisioned as well. All such isomeric forms of these compounds are expressly included in the present invention. The compounds of this invention may also be represented in multiple tautomeric forms, in such instances, the invention expressly includes all tautomeric forms of the compounds described herein. All such isomeric forms of such compounds are expressly included in the present invention. All crystal forms of the compounds described herein are expressly included in the present invention.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

All references cited herein, whether in print, electronic, computer readable storage media or other form, are expressly incorporated by reference in their entirety, including but not limited to, abstracts, articles, journals, publications, texts, treatises, internet web sites, databases, patents, and patent publications.

A number of embodiments of the invention have been described. Nevertheless, it will be understood that various modifications may be made without departing from the spirit and scope of the invention. Accordingly, other embodiments are within the scope of the following claims.

What is claimed is:

1. A composition comprising the reaction products of unsaturated fatty acids with one or more poly alpha (hydroxy)aliphatic acids, and less than 10 weight % of one or more multifunctional (meth)acrylate ester, vinyl ethers, or combinations thereof.

2. The composition of claim 1, further comprising 0.4 to 4 weight % of one or more organic zirconium(4) compounds.

3. The composition of claim 1, further comprising one or more inorganic salts of peracids.

4. The composition of claim 1, further comprising 0.4 to 4 weight % of one or more organic zirconium(4) compounds, and one or more inorganic salts of peracids.

5. The composition of claim 1 comprising 2 to 15 weight percent of the reaction products of drying oil derived fatty acid(s) and 10–35 wt % of poly alpha (hydroxy)aliphatic acid(s), 0.4 to 4 weight % of one or more organic zirconium (4) compounds, 1 to 7 weight % of one or more multifunctional (meth)acrylate esters, vinyl ethers, or combinations thereof, and catalytic proportions of one or more inorganic salts of peracids.

6. The composition of claim 1, further comprising catalytic proportions of organic (hydro)peroxides.

7. A method of printing comprising using an ink comprising the composition of claim 1.

8. The method of claim 7, wherein the printing comprises applying the ink to a press.

9. The method of claim 7, wherein the printing is lithographic printing.

10. The method of claim 7, wherein the printing comprises printing on paper.

11. A method of printing comprising using an ink vehicle or varnish comprising the composition of claim 1.

12. The method of claim 11, wherein the ink vehicle or varnish is mixed with a fountain solution.

13. A printing ink or printing ink varnish comprising the composition of claim 1 and one or more organic zirconium (4) compounds.

14. The printing ink or printing ink varnish of claim 13, wherein the organic zirconium(4) compounds comprise 0.4 to 4 weight % of the total solution.

15. A method of printing comprising mixing the printing ink or printing ink varnish of claim 13 with a fountain solution.

16. The method of claim 15, wherein the ink vehicle or varnish comprises 2 to 15 weight percent of the reaction products of drying oil derived fatty acid(s) and 10–35 wt % of poly alpha (hydroxy)aliphatic acid(s).

17. The method of claim 16, wherein the ink vehicle or vanish further comprises 1 to 7 weight % of one or more multifunctional (meth)acrylates, and/or vinyl esters.

18. The method of claim 16, wherein to fountain solution further comprises an organic (hydro)peroxides or an inorganic salt of a peracid.

19. The method of claim 15, wherein the ink vehicle or varnish comprises solids, alkyds, polyesters or polyamides.

20. The composition of claim 1, further comprising one or more additional ink vehicle or varnish components.

21. The composition of claim 20, wherein the additional ink vehicle or varnish components are solids, alkyds, polyesters or polyamides.

22. The composition of claim 2, wherein the organozirconium compound is any of
  zirconium(4) tetrakis octanolato, adduct 2 moles of (bis tridecyl) phosphite;
  zirconium(4) tetrakis i-decanolato, adduct 2 moles of (tris lauryl) phosphite;
  oxo zirconium(4) bis i-pentadecanoate;
  zirconium(4) 2-propanolato, tris (bis butyl)phosphato-O;
  zirconium(4) neodecanolato, tris (phenyl) sulfonato-O;
  zirconium(4) t-butanolato, tris (ethyl, benzyl) phosphito;
  zirconium(4) bis iso-hexanolato, cyclo (bis allyl) diphosphato-O,O;
  ethylenediolato zirconium(4) cyclo (bis allyl) diphosphato-O,O;
  1,3-propylendiolato zirconium(4) linolenate, myristate; or
  Bis 1,4-butene-2 diolato zirconium(4) adduct 1 mole of tris (bis oleyl) phosphite.

23. The printing ink or printing ink varnish of claim 13, wherein the organozirconium compound is any of:
  zirconium(4) tetrakis octanolato, adduct 2 moles of (bis tridecyl) phosphite;
  zirconium(4) tetrakis i-decanolato, adduct 2 moles of (tris lauryl) phosphite;
  oxo zirconium(4) bis i-pentadecanoate;
  zirconium(4) 2-propanolato, tris (bis butyl)phosphato-O;
  zirconium(4) neodecanolato, tris (phenyl) sulfonato-O;
  zirconium(4) 1-butanolato, tris (ethyl, benzyl) phosphito;
  zirconium(4) bis iso-hexanolato, cyclo (bis allyl) diphosphato-O,O;
  ethylenediolato zirconium(4) cyclo (bis allyl) diphosphato-O,O;
  1,3-propylendiolato zirconium(4) linolenate, myristate; or
  Bis 1,4-butene-2 diolato zirconium(4) adduct 1 mole of tris (bis oleyl) phosphite.

24. The method of claim 7, wherein the organozirconium compound is any of;
  zirconium(4) tetrakis octanolato, adduct 2 moles of (bis tridecyl) phosphite;
  zirconium(4) tetrakis i-decanolato, adduct 2 moles of (tris lauryl) phosphite;
  oxo zirconium(4) bis i-pentadecanoate;
  zirconium(4) 2-propanolato, tris (bis butyl)phosphato-O;
  zirconium(4) neodecanolato, tris (phenyl) sulfonato-O;
  zirconium(4) 1-butanolato, tris (ethyl, benzyl) phosphito;
  zirconium(4) bis iso-hexanolato, cyclo (bis allyl) diphosphato-O,O;
  ethylenediolato zirconium(4) cyclo (bis allyl) diphosphato-O,O;
  1,3-propylendiolato zirconium(4) linolenate, myristate; or
  Bis 1,4butene-2 diolato zirconium(4) adduct 1 mole of tris (bis oleyl) phosphite.

25. The method of claim 15, wherein the organozirconium compound is any of:
  zirconium(4) tetrakis octanolato, adduct 2 moles of (bis tridecyl) phosphite;
  zirconium(4) tetrakis i-decanolato, adduct 2 moles of (tris lauryl) phosphite;
  oxo zirconium(4) bis i-pentadecanoate;
  zirconium(4) 2-propanolato, tris (bis butyl)phosphato-O;
  zirconium(4) neodecanolato, tris (phenyl) sulfonato-O;
  zirconium(4) t-butanolato, tris (ethyl, benzyl) phosphito;
  zirconium(4) bis iso-hexanolato, cyclo (bis allyl) diphosphato-O,O;
  ethylenediolato zirconium(4) cyclo (bis allyl) diphosphato-O,O;
  1,3-propylendiolato zirconium(4) linolenate, myristate; or
  Bis 1,4-butene-2 diolato zirconium(4) adduct 1 mole of tris (bis oleyl) phosphite.

26. The composition of claim 1, wherein the poly alpha (hydroxy)aliphatic acid(s) is any of:
  hydroxy acetic acid;
  2- hydroxy propionic acid;
  2-hydroxy-2-methyl 3-butenoic acid,;
  2 hydroxy butyric acid;
  hydroxy acetic acid, 3-hydroxy i-pentanoic acid;
  2-hydroxy-3-methoxy-isobutyric acid; or
  2 hydroxy-4-butyrolactone, 2-hydroxy propionic acid, 2-hydroxy 4-pentenoic acid.

27. The composition of claim 1, wherein the multifunctional (meth)acrylate ester is any of:
  Tris methylol propane tris acrylate;
  pentaerythritol trimethacrylate;
  sorbitol tetrakis acrylate;
  tetrakis 1,2-propylene glycol acrylate, methacrylate;
  terphthalic acid bis 2-methacrylatoethyl ester;

ethoxylated(3) bisphenol A dimetacrylate;
acrylate terminated polybutadiene(12);
Bis trimethylol propane bis acrylate, bis allyl ether;
zinc bis methacrylate; or
60% castor oil tris acrylate, 40% 1,4-cyclhexane bis methacrylate.

28. A composition made by the process of combining 2 to 15 weight percent of drying oil derived fatty acid solutions of—10–35 wt % of poly alpha (hydroxy)aliphatic acid(s), 0.4 to 4 weight % of one or more organic zirconium(4) compounds, 1 to 7 weight % of one or more multifunctional (meth)acrylate esters, and catalytic proportions of one or more inorganic salts of peracids.

29. The composition of claim 27, further comprising water.

* * * * *